3,290,208
ADHESIVE COMPOSITION FOR METAL TO METAL STRUCTURAL APPLICATIONS COMPRISING A POLYURETHANE RESIN AND A MONOMERIC GLYCIDYL ESTER
Armand Francis Lewis, Fairfield, and Wallace Burton Ramsey, Stamford, Conn., assignors to American Cyanamid Company, Stamford, Conn., a corporation of Maine
No Drawing. Filed Apr. 23, 1963, Ser. No. 274,911
10 Claims. (Cl. 161—190)

This invention relates to a novel adhesive composition. More particularly, this invention relates to a novel adhesive composition comprising a uniform mixture of a polyurethane resin, a diamine curing agent, and an additive compound comprising a diglycidyl ester, a diglycidyl ether, a monoethylenically unsaturated monoglycidyl ether or a monoethylenically unsaturated monoglycidyl ester. Still more particularly, this invention relates to novel adhesive compositions which are excellent for metal to metal bonding and which are composed of polyurethane resins, either polyester based or polyether based, having blended therewith in a ratio of from about 1:2 to about 1:11 a diglycidyl ester, a diglycidyl ether, a monoethylenically unsaturated monoglycidyl ester or a monoethylenically unsaturated monoglycidyl ether.

Previous to our invention, adhesives composed of polyurethane resins, catalysts and curing agents useful for metal to metal bonding have been known. Although excellent for many applications, these prior art adhesives have been deficient for many purposes and have not had the lap shear strength and peel strength properties necessary to allow their usage in many fields. We have now discovered that these known prior art adhesive compositions can be improved in lap shear strength, peel strength and other properties by the incorporation of a diglycidyl ester, a diglycidyl ether, a monoethylenically unsaturated monoglycidyl ester or a monoethylenically unsaturated monoglycidyl ether into the polyurethane resin. We have found that the incorporation of these compounds into the polyurethane resin composition increases the peel strength, at room temperature and at 100° C. for example, almost twofold in many instances and sometimes even higher. It was indeed surprising that these results would be accomplished in view of the fact that the incorporation of many other compounds similar in structure to the compounds contemplated herein did not give the superior results we have obtained.

It is therefore an object of the present invention to provide novel adhesive compositions.

It is a further object of the present invention to provide novel adhesive compositions comprising uniform mixtures of a polyurethane resin with a diamine curing agent, and a compound comprising a diglycidyl ester, a diglycidyl ether, a monoethylenically unsaturated glycidyl ester or a monoethylenically unsaturated glycidyl ether.

These and other objects will become more apparent to one skilled in the art upon reading the more detailed description set forth hereinbelow.

THE POLYURETHANES

Any polyester based or polyether based polyurethane resin may be used in producing the novel adhesives of the present invention. Among the reactive organic polyfunctional polyols employed in preparing one class of polyurethane resins used in the practice of our invention by reaction with a suitable isocyanate compound are the polyalkylene ether, thioether, and ether-thioether glycols represented by the general formula:

wherein R represents the same or different alkylene radicals containing up to about 10 carbon atoms, X represents oxygen or sulfur, and $n$ is an integer large enough so that the molecular weight of the polyalkylene ether, thioether, or ether-thioether glycol is at least about 500, e.g., from about 500 to about 10,000. The polyalkylene ether glycols included within this general formula, such as polyethylene glycols, polypropylene glycols, polybutylene glycols, polytetramethylene glycols, polyhexamethylene glycols, and the like, which are obtained, for example, by acid-catalyzed condensation of the corresponding monomeric glycols or by the condensation of lower alkylene oxides, such as ethylene oxide, propylene oxide, and the like, either with themselves or with glycols such as ethylene glycol, propylene glycol, and the like, are preferred.

Polyalkylenearylene ether, thioether and ether-thioether glycols which also have molecular weights ranging from about 500 to about 10,000 but which differ from the above-described polyalkylene glycols in having arylene radicals, such as phenylene, naphthylene and anthrylene radicals, either unsubstituted or substituted, e.g., with alkyl or aryl groups, and the like, in place of some of the alkylene radicals of said polyalkylene glycols may also be employed as polyol reactants. Polyalkylenearylene glycols of the type ordinarily used for this purpose will usually contain at least one alkylene ether radical having a molecular weight of about 500 for each arylene radical present.

Essentially linear polyesters containing a plurality of isocyanate-reactive hydroxyl groups constitute another class of reactive organic polyfunctional polyols which may be employed in preparing polyurethane resins useful in the practice of the present invention. While the preparation of polyesters suitable for this purpose has been described in great detail in the prior art, and forms no part of the present invention per se, it may be mentioned here by way of illustration that polyesters of this type may be prepared by the condensation of a polyhydric alcohol, generally a saturated aliphatic diol such as ethylene glycol, propanediol-1,2, propanediol-1,3, butanediol-1,3, butanediol-1,4, pentanediol-1,2, pentanediol-1,5, hexanediol-1,3, hexanediol-1,6, diethylene glycol, dipropylene glycol, triethylene glycol, tetraethylene glycol, and the like, as well as mixtures of such diols with each other and with minor amounts of polyols having more than two hydroxyl groups, preferably saturated aliphatic polyols such as glycerol, trimethylol ethane, trimethylol propane, pentaerythritol, sorbitol, and the like, with a polycarboxylic acid or anhydride, generally a dicarboxylic acid or anhydride which is either saturated or which contains only benzenoid unsaturation, such as oxalic, malonic, succinic, glutaric, adipic, pimelic, suberic, azelaic, sebacic, malic, phthalic, cyclohexanedicarboxylic, and endomethylenetetrahydrophthalic acids, and the like and their isomers, homologs, and other substituted derivatives, e.g., chloroderivatives, or with mixtures of such acids with each other and with unsaturated dicarboxylic acids or anhydrides such as maleic, fumaric, citraconic, and itaconic acids, and the like, as well as with polycarboxylic acids containing three or more carboxyl groups, such as aconitic acid and the like.

The essentially linear polyesters commonly used in preparing polyurethane resins preferably have molecular weights ranging from about 750 to about 3,000. In addition, they will generally have relatively low acid numbers, e.g., acid numbers not appreciably in excess of about 60 and preferably as low as can be practicably obtained, e.g., 2 or less. Correspondingly, they will generally have relatively high hydroxyl numbers, e.g., from about 30 to about 700. When preparing these polyesters, an excess of polyol over polycarboxylic acid is generally used to insure that the resulting essentially linear polyester chains contain a sufficient amount of reactive hydroxyl groups.

Another class of suitable organic polyfunctional polyol reactants includes polyalkylene ether polyols containing more than two reactive hydroxyl groups, such as polyalkylene ether triols, tetrols, and the like, which are prepared, for example, by reacting polyols such as glycerol, trimethylol ethane, trimethylol propane, pentaerythritol, dipentaerythritol, sorbitol, and the like, with lower alkylene oxides such as ethylene oxide, propylene oxide, and the like.

Nitrogen-containing polyfunctional polyols may also be used as polyol reactants. Among such materials there are included the polyesteramides conventionally employed in the preparation of polyurethane resins, i.e. those having molecular weights ranging from about 750 to about 3,000, acid numbers ranging from about 60 as a maximum to as low as can be practicably obtained, e.g., 2 or less, and hydroxyl numbers ranging from about 30 to about 700, and also high molecular weight polyamino alcohols, such as hydroxypropylated alkylene diamines of the general formula $$(HOH_6C_3)_2N-R-N(C_3H_6OH)_2$$

wherein R represents an alkylene radical having from 2 to 6 carbon atoms, inclusive, of which N,N,N',N'-tetrakis-(2-hydroxypropyl)-ethylenediamine is a representative species, as well as higher analogs thereof, such as hydroxypropylated polyalkylenepolyamines of the general formula

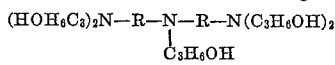

wherein R is as defined hereinabove (see U.S. Patent No. 2,697,118 to Lundsted et al.).

As can be readily appreciated, mixtures of the various reactive organic polyfunctional polyols described hereinabove may also be employed in preparing polyurethane resins useful in the practice of the present invention.

Just as in the case of the polyol reactant, polyurethane resins may be prepared using a wide variety of organic polyisocyanates, among which there are included aromatic diisocyanates, such as m-phenylenediisocyanate, p-phenylenediisocyanate, 4 - t - butyl-m-phenylenediisocyanate, 4-methoxy-m-phenylenediisocyanate, 4-phenoxy-m-phenylenediisocyanate, 4-chloro-m-phenylenediisocyanate, toluenediisocyanates (either as a mixture of isomers, e.g., the commercially available mixture of 80% 2,4-toluenediisocyanate and 20% 2,6-toluenediisocyanate, or as the individual isomers themselves), m-xylylenediisocyanate,
p-xylylenediisocyanate,
cumene-2,4-diisocyanate,
durenediisocyanate,
1,4-naphthylenediisocyanate,
1,5-naphthylenediisocyanate,
1,8-naphthylenediisocyanate,
2,6-naphthylenediisocyanate,
1,5-tetrahydronaphthylenediisocyanate,
p,p'-diphenyldiisocyanate,
diphenylmethane-4,4'-diisocyanate,
2,4-diphenylhexane-1,6-diisocyanate,
"bitolylenediisocyanate" (3,3'-dimethyl-4,4'-biphenylenediisocyanate),
"dianisidinediisocyanate" (3,3'-dimethoxy-4,4'-biphenylenediisocyanate), and
polymethylenepolyisocyanates
represented by the general formula

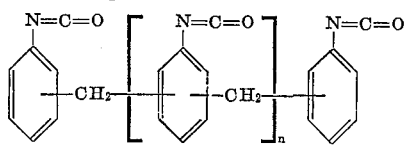

wherein $n$ represents an integer between 0 and about 5, and the like; aliphatic diisocyanates, such as methylenediisocyanate, ethylenediisocyanate, the tri-, tetra-, penta-, hexa-, hepta-, oct-, non- and decamethylene-ω,ω'-diisocyanates, 2-chlorotrimethylenediisocyanate, 2,3-dimethyltetramethylenediisocyanate, and the like, and tri- and higher isocanates, such as benzene-1,3,5-triisocyanate, toluene - 2,4,6-triisocyanate, diphenyl-2,4,4'-triisocyanate, triphenylmethane-4,4',4''-triisocyanate, and the like. Mixtures of two or more of such organic polyisocyanates may also be employed to prepare the polyurethane resins by reaction with the ethers and esters described above utilizing procedures well known to those skilled in the art, see for example, U.S. Patents 2,729,618, 3,016,364 and the like.

Examples of these known polyurethane production procedures include the so-called "pre-polymer" technique, as commonly practiced in the production of polyurethane resins, which involves mixing polyol and polyisocyanate under substantially anhydrous conditions, i.e., with usually not more than about 0.2% by weight of water, based on the total weight of the mixture, being present, and with a molar excess of the polyisocyanate over the polyol usually being employed, reacting this mixture at a temperature ranging from about room temperature to about 100° C. for from about 20 minutes to about 8 hours, and then cooling the resulting "pre-polymer" to a temperature of from about room temperature to about 60° C.

Furthermore, particulate or fibrous fillers, such as chopped α-cellulose, asbestos or glass fibers, and the like, conventional fire-retarding additives, for example, phosphates such as triphenyl phosphate, tricresyl phosphate, tris(2,3-dibromopropyl) phosphate, tris(β-chloroethyl) phosphate, and the like, dyes or pigments, e.g., silica pigments, stabilizers, and the like may be added to the polyurethane resins.

THE GLYCIDYL ADDITIVES

The diglycidyl ethers, diglycidyl esters, monoethylenically unsaturated monoglycidyl ethers, and monoethylenically unsaturated monoglycidyl esters which are encompassed by the concept of the present invention include such materials as glycidyl methacrylate, glycidyl acrylate, allyl glycidyl ether, diglycidyl phthalate, glycidyl benzyl acrylamide, the diglycidyl ether of 2,2-bis(p-hydroxyphenyl)propane and other aryl or alkyl diglycidyl esters and ethers and monoethylenically unsaturated monoglycidyl ethers and esters known to those skilled in the art. We have found that these difunctional compounds materially increase the adhesion and the strength of products which have been bonded utilizing our adhesive composition. We have found that amounts of diglycidyl ether, diglycidyl ester, monoethylenically unsaturated monoglycidyl esters or monoethylenically unsaturated monoglycidyl ethers added to the polyurethane polymer are critical and, as such, ratios of from about 1:2 parts to about 1:11 parts of the esters or ethers to the polyurethanes, respectively, should be employed, with amounts from about 1:4 parts to 1:10 parts being preferred.

THE CURING AGENTS

For purposes of this invention, it is possible to incorporate any diamine curing agent into the polyurethane resins, including those in prepolymer form, obtained as set forth hereinabove. The diamine curing agents utilized include for example, the alkyl and aryl diamines, such as hexamethylenediamine, 4,4'-diaminodiphenylmethane, benzidene and its derivatives, p-phenylenediamine, 4,4'-diamino - 3,3' - dimethyldiphenylmethane, 4,4' - diamino 3,3'-dimethhoxydiphenylmethane, 3,3' - dichlorodiaminodiphenylmethane and the like. A preferred group of compounds are those designated as the diaminodihalodiaryls of which 4,4'-methylene-bis-2-orthochloroaniline is an example. The diamines are incorporated into the urethane prepolymer syrups in amounts ranging from about 60% to about 130%, preferably about 80% to about 110%, of the stoichiometric equivalent of polyurethane.

The manner in which the ingredients of our novel compositions are incorporated is not critical and any combination of additions may be employed without varying from the scope of the present invention. We have found however, that generally it is preferable to premix the diamine curing agent and the mono- or diglycidyl ether or ester and add to this mixture at room temperature the polyurethane. However, such a procedure is not critical and it is within the scope of the present invention to mix the ingredients with the resin first and then add the mono- or diglycidyl ester or ether. Our novel compositions allow those skilled in the art to bond materials such as steel, aluminum and other metals, wood, paper, plastics, leathers and the like together so as to create a permanent bond with high peel strength.

Modifications and changes which may be made in conventional polyurethane reaction mixtures to provide resins having various degrees of flexibility, rigidity and other properties are so well known in the art that no more than a brief mention of some of them need be made here. Thus, in addition to those previously indicated, i.e., using essentially linear polyesters and polyesteramides having certain specified molecular weights, acid numbers and hydroxyl numbers and varying the mol ratio of polyisocyanate to polyol, numerous other modifications, such as using tri- or higher functional monomeric polyols or polycarboxylic acids in preparing the polyol reactant, using tri- or higher functional polyisocyanates, and the like, have been disclosed in the prior art to the accomplishment of these ends. It is contemplated that any or all of these modifications, together with any other manipulative steps described in prior art processes for the preparation of polyurethane resins may be appropriated to the practice of the present invention.

The use of catalysts in the novel compositions of the present invention is not critical, however, we have found that any free-radical generating catalyst may be incorporated into the compositions wherein the monoethylenically unsaturated monoglycidyl ethers and esters have been used in order to obtain a faster rate of cure etc. especially at room temperature. Catalysts which are exemplary of this class include [2,5-dimethyl-2,5-di(t-butylperoxy)hexane], t-butyl perbenzoate, dicumyl peroxide, benzoyl peroxide, azobisisobutyronitrile, the dialkyl peroxides, e.g., diethyl peroxide, the alkyl hydrogen peroxides, e.g., t-butylhydrogen peroxide, symmetrical diacyl peroxides, e.g., acetyl peroxide, and the like in amounts ranging from about 0.1% to about 3.0%, preferably about 1.0% to about 2.0%, by weight, based on the weight of the monoglycidyl ester or ether added.

The following examples are set forth for purposes of illustration only and are not to be construed as limitations on the present invention except as set forth in the appended claims.

Example 1

Two parts of glycidyl methacrylate are added to 1.44 parts of finely pulverized 3,3'-methylenebisorthochloroaniline in a suitable reaction vessel. The mixture is then warmed to a temperature of about 65° C. in order to dissolve the materials. The resultant mixture is then cooled to 30° C. and 0.02 part of 2,5-dimethyl-2,5-di(t-butylperoxy)n-hexane is added as a catalyst, with agitation, to dissolve the added ingredient. To the resultant mixture is then added 18 parts of a polyester based (90/10 ethylene glycol/propylene glycol adipate) commercially available polyurethane resin. The resultant mixture is then blended into a smooth paste. Two aluminum plates, measuring 6" x 11", are treated with chromic acid in order to achieve a clean surface. The polyurethane adhesive is then spread evenly on one plate and then on the other plate and the two are set on top of each other. The sandwich is then placed in an electrically heated hydraulic press at a temperature of 105° C. The sandwich is kept under a pressure of about 170 p.s.i. at the 105° temperature for about 1 hour. The temperature is then raised to 158° C. and held for an additional hour. The sandwich is removed from the press and placed in an oven at 80° C. for about 15 hours. The resultant sandwich shows the following results (Table I) when subjected to tests designed to indicate peel strength and lap shear strength values.

Example 2

Following the procedure of Example 1 except that an equivalent amount of a polyether based (polytetramethyleneoxide type) commercially available polyurethane resin is used, two aluminum plates (6" x 11") are bonded together and subjected to tests indicating peel strength and lap strength. The results are given below in Table I.

Following the procedures of Examples 1 and 2, various diglycidyl esters and ethers and monoethylenically unsaturated monoglycidyl ethers and esters are added to various commercially available polyurethane resins in ratios varying from 1:2 to 19:1 (urethane/additive) and the results are given below in Table I.

TABLE I

| Ex. | Polyurethane of Example | Additive | Ratio | Curing Agent | Lap Shear Strength, lb./in. | | Peel Strength, lb./in. | |
|---|---|---|---|---|---|---|---|---|
| | | | | | 23° C. | 100° C. | 23° C. | 100° C. |
| 1 | (1) | GMA | 9/1 | MOCA | 2,700 | 1,800 | 120 | 100 |
| 2 | (2) | GMA | 9/1 | MDA | 2,400 | 1,600 | 58 | 39 |
| 3 | (2) | | | MOCA | 1,435 | 800 | 23 | 5 |
| 4 | (1) | | | MOCA | 1,200 | 600 | 57 | 13 |
| 5 | (1) | GMA | 19/1 | MOCA | 2,000 | 1,400 | 34 | 4 |
| 6 | (1) | GMA¹ | 4/1 | PDA | 1,000 | 800 | 66 | 40 |
| 7 | (1) | GMA | 2/1 | MOCA | 1,200 | 950 | 55 | 34 |
| 8 | (1) | GMA | 1/1 | MDA | 1,700 | 600 | 45 | 6 |
| 9 | (1) | GMA | 1/2 | PDA | 1,900 | 800 | 30 | 0 |
| 10 | (1) | DGEP¹ | 1/2 | MOCA | | | 10 | 0 |
| 11 | (1) | DGEP¹ | 1/1 | MOCA | | | 12 | 0 |
| 12 | (2) | DGEP¹ | 2/1 | MOCA | | | 50 | 27 |
| 13 | (2) | DGEP¹ | 7/1 | MOCA | | | 56 | 37 |
| 14 | (1) | DGEP¹ | 9/1 | MOCA | 2,700 | 1,800 | 91 | 54 |
| 15 | (1) | DGEP¹ | 11/1 | PDA | | | 51 | 37 |
| 16 | (2) | DGEP¹ | 13/1 | MOCA | | | 42 | 10 |
| 17 | (1) | AGE | 9/1 | MOCA | | | 72 | 47 |
| 18 | (1) | DGP¹ | 9/1 | MOCA | | | 87 | 59 |
| 19 | (2) | GA | 9/1 | PDA | | | 82 | 55 |
| 20 | (2) | PGE | 9/1 | MOCA | 1,000 | 200 | 16 | 0 |
| 21 | (1) | GBA | 9/1 | MDA | | | 56 | 30 |
| 22 | (1) | PMA | 9/1 | MOCA | | | 25 | 0 |
| 23 | (1) | MMA | 9/1 | MOCA | | | 27 | 8 |

¹ No catalyst.
GMA = glycidyl methacrylate.
DGEP = the diglycidyl ether of 2,2-bis (p-hydroxyphenyl)propane.
AGE = allyl glycidyl ether.
DGP = diglycidyl phthalate.
GA = glycidyl acrylate.
PGE = phenyl glycidyl ether.
GBA = glycidoxy benzyl acrylamide.
PMA = propyl methacrylate.
MMA = methyl methacrylate.
MOCA = 4,4'-methylene-bis-2-orthochloroaniline.
MDA = 4,4'-diaminodiphenylmethane.
PDA = p-phenylene diamine.

We claim:
1. An adhesive composition comprising a uniform mixture of
   (A) a polyurethane resin,
   (B) about 60% to about 130%, of the stoichiometric equivalent weight of (A), of a diamine curing agent, and
   (C) a monomeric compound selected from the group consisting of glycidyl methacrylate and glycidyl acrylate, the ratio of (C) to (A) ranging from about 1:2 to 1:11, respectively.
2. An adhesive composition according to claim 1 wherein (B) is 4,4'-methylene-bis-2-orthochloroaniline.
3. An adhesive composition according to claim 1 wherein (C) is glycidyl methacrylate.
4. An adhesive composition according to claim 2 wherein (C) is glycidyl methacrylate.
5. An adhesive composition according to claim 1 wherein (B) is 4,4'-methylene-bis-2-orthochloroaniline, (C) is glycidyl methacrylate and the ratio of (C) to (A) is about 1:9.
6. A composition according to claim 1 wherein (C) is glycidyl acrylate.
7. A unitary structure composed of at least two metal layers, said layers being bonded with the adhesive composition of claim 1.
8. A unitary structure according to claim 7 wherein (C) is glycidyl acrylate.
9. A unitary structure composed of at least two metal layers, said layers being bonded with an adhesive composition composed of a uniform mixture of
   (a) a polyurethane resin,
   (b) about 60% to about 130%, of the stoichiometric equivalent weight of (a), of a diamine curing agent, and
   (c) glycidyl methacrylate, the ratio of (c) to (a) ranging from about 1:2 to about 1:11, respectively.
10. A unitary structure composed of at least two metal layers, said layers being bonded with an adhesive composition composed of a uniform mixture of
   (a) a polyurethane resin,
   (b) from about 60% to about 130%, of the stoichiometric equivalent weight of (a), of 4,4'-methylene-bis-2-orthochloroaniline and
   (c) glycidyl methacrylate, the ratio of (c) to (a) ranging from about 1:2 to about 1:11, respectively.

References Cited by the Examiner

UNITED STATES PATENTS

| | | | |
|---|---|---|---|
| 2,556,075 | 6/1951 | Erickson | 260—88.3 |
| 2,888,439 | 5/1959 | Simons | 260—830 |
| 3,042,545 | 7/1962 | Kienle et al. | 260—835 |
| 3,148,167 | 9/1964 | Keplinger | 260—830 |
| 3,158,586 | 11/1964 | Krause | 260—835 |
| 3,214,392 | 10/1965 | Worsley | 260—858 |

OTHER REFERENCES

Bodner et al., "Adhesives Age," vol. 2, No. 4 (April 1959), pages 29–33.

MURRAY TILLMAN, *Primary Examiner.*

J. C. BLEUTGE, *Assistant Examiner.*